United States Patent [19]

Brüel

[11] 4,357,499

[45] Nov. 2, 1982

[54] ACOUSTIC TEST BOX

[76] Inventor: Per V. Brüel, Fuglevangsvej 5, Rungsted Kyst, Denmark, DK-2960

[21] Appl. No.: 217,009

[22] PCT Filed: Mar. 21, 1980

[86] PCT No.: PCT/DK80/00018

§ 371 Date: Nov. 22, 1980

§ 102(e) Date: Nov. 14, 1980

[30] Foreign Application Priority Data

Mar. 22, 1979 [DK] Denmark ........................ 1172/79

[51] Int. Cl.[3] ........................ H04R 29/00; G01V 1/00

[52] U.S. Cl. ........................ 179/175.1 A; 73/432 R; 179/107 R; 179/175

[58] Field of Search .................. 179/1 E, 1 N, 1 GA, 179/146 E, 107 R, 175.1, 175, 175.1 A; 181/185, 0.5, 153, 131, 136, 198, 207; 73/571, 587, 432 R

[56] References Cited

U.S. PATENT DOCUMENTS 3,558,833 2/1969 McCrory, Jr. et al. ......... 179/175.1
3,692,959 9/1972 Lamp ........................ 179/175.1 A
3,923,119 12/1975 Frye ........................ 179/175.1 A
3,968,334 7/1976 Padilla ........................ 179/175
4,065,647 12/1977 Frye et al. .................. 179/175.1 A
4,170,720 10/1979 Killion ........................ 179/107 R

*Primary Examiner*—Thomas A. Robinson
*Attorney, Agent, or Firm*—LeBlanc, Nolan, Shur & Nies

[57] ABSTRACT

In prior art acoustic test boxes, which can function as small anechoic chambers, it has been difficult to attain a frequency-independent pressure field at the test point without simultaneously increasing the frequency dependency of the velocity field, whereby tests of objects which are partly pressure sensitive and partly velocity sensitive are vitiated by errors. An elongated acoustic test box provided exclusively with curved surfaces and with space for an effective sound absorbent behind the test object overcomes this problem and at the same time provides improved acoustic insulation against low-frequency ambient noise. In a particularly appropriate embodiment the box (1) is shaped like an egg supported at its narrow end on a support (2) and divided about two-thirds of the way up into a bottom part (4) and a cover (5), the latter containing a sound source (10).

7 Claims, 2 Drawing Figures

ACOUSTIC TEST BOX

The present invention is concerned with a container for acoustic testing, comprising a rigid box lined internally with sound-absorbing material which encloses a test chamber housing a sound source, a test object and a microphone. Such a container is intended to serve as a small, anechoic chamber for use in e.g. recording the frequency response of hearing-aid spectacles.

It is a known practice to make such acoustic test boxes in the form of a miniature room, i.e. of a cubic box with a lid which gives access to an anechoic chamber in the interior of the box. Such acoustic test boxes are often used for recording the frequency response of hearing aids, and microphones in hearing aids formerly used to be mainly pressure sensitive, but efforts to keep the weight of hearing aids to a minimum have resulted in the microphones becoming more velocity sensitive as the walls of the microphone housing are made increasingly thin. Because it is not known beforehand whether the microphone to be tested is velocity sensitive or pressure sensitive, it is necessary to require the anechoic chamber to display a constant velocity field as well as a constant pressure field throughout the frequency range over which the frequency response is to be tested. This cannot be achieved in the box-shaped test chambers known hitherto, because reflection conditions have the effect that when one field is at a maximum the other one is at a minimum. It is likewise difficult to provide the previously known box-shaped test chamber with the rigidity necessary to provide insulation from ambient low-frequency noise.

An acoustic test box in accordance with the present invention does not suffer from these drawbacks, as the container consists entirely of curved surfaces, and moreover it has an elongated shape in order to be able to accommodate an effective sound-absorbing structure behind the test object. Thereby a frequency response is obtained in the test chamber which is the same for pressure and velocity. A further advantage of making the box with curved surfaces is that resonance phenomena in relation to the acoustic field generated by the built-in sound source are reduced to a negligible level.

Figure 1:
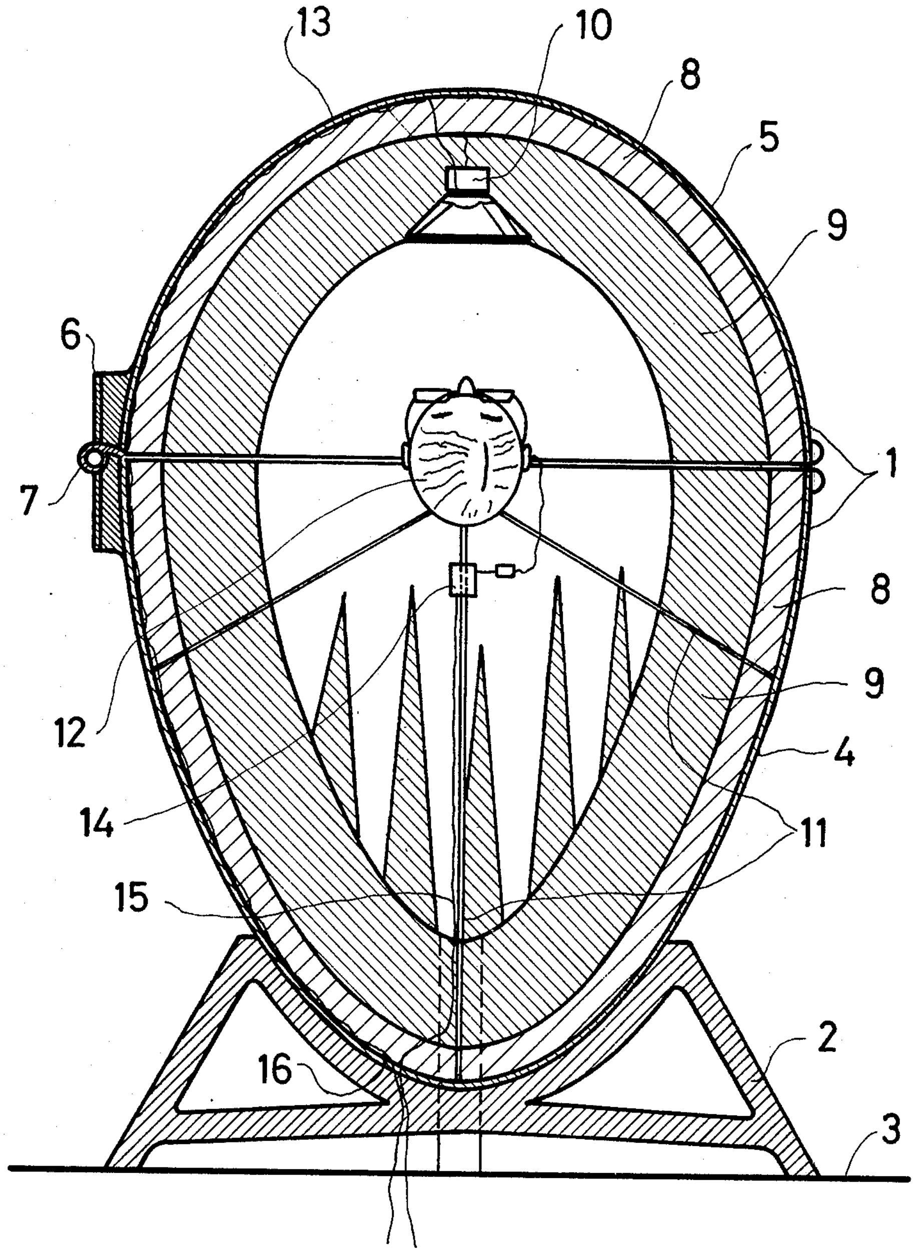
Figure 2:
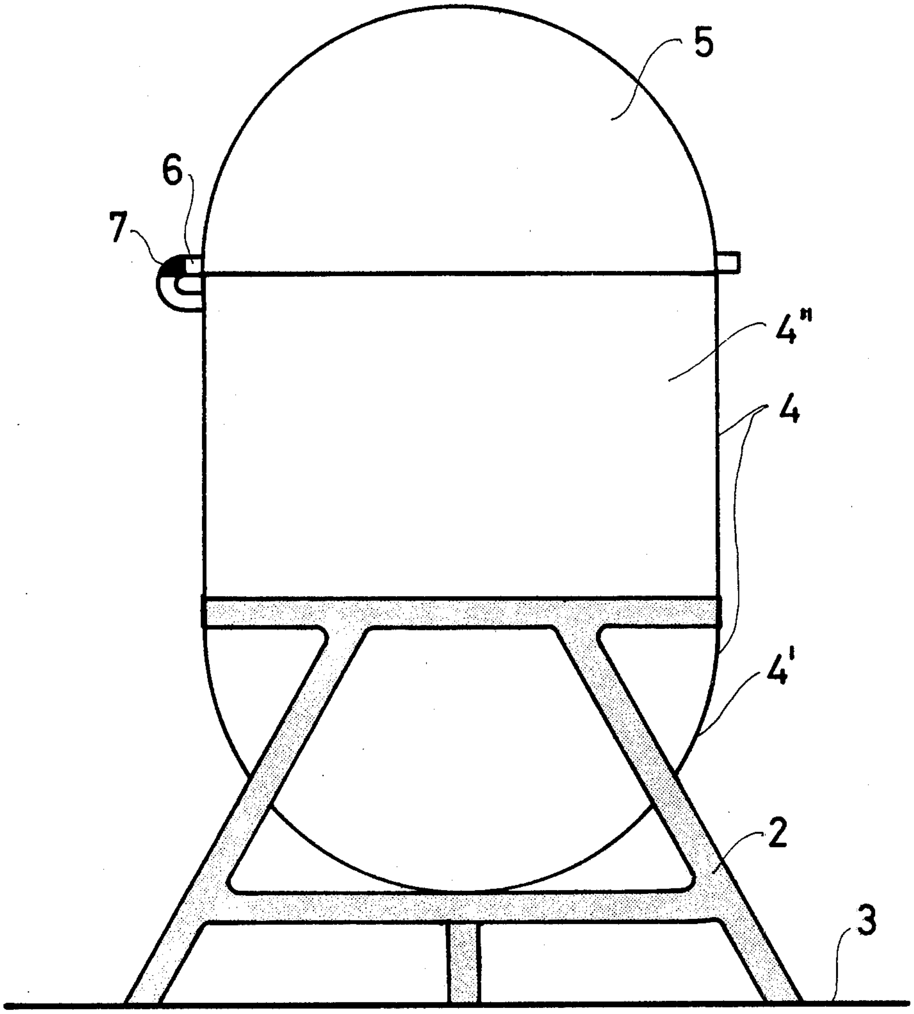

Further inventive characteristics of a preferred embodiment of the acoustic test box according to the invention will be apparent from the more detailed description thereof in conjunction with the drawings, in which:

FIG. 1 shows an axial section through a preferred embodiment of an acoustic test box; and FIG. 2 shows, in sketch form, another possible embodiment.

The reference numeral 1 in the drawing denotes a box, which is shaped like an egg. The box 1 is fixed at its narrow end to a support 2, which is designed to stand on a floor 3. The box 1 is divided along a horizontal section about two-thirds of the way up from its narrow end into a bottom part 4 and a cover 5. The bottom part and the cover are hinged together by means of a hinge 6, whose pivot line 7 is located outside the bottom part 4 so that the cover 5 is reliably guided into a tight fit with the bottom part 4. Glued to the inner surface of the bottom part and of the cover there is a layer 8 of polyurethane foam, and the inner surface of this layer 8 is lined with a reflection-damping layer 9 which in the region behind the test object (hearing-aid spectacles) is structured in accordance with the principles known from conventional anechoic chambers. The layer 8 serves particularly to damp vibrations in the box 1, whereas the layer and structure 9 consists of glass wool of density approxl. 30 kg per cub.m.

Fixed inside the cover 5 there is a sound source 10 in the form of a loudspeaker, which in this location escapes the risk of mechanical overload, being out of the way when test objects are being placed in position in the bottom part 4. A conductor 13 to the loudspeaker 10 is attached to the inner surface of the container and passes out through the latter to exterior measurement apparatus which is not illustrated. A support 11 is fixed to the bottom part 4 and serves to support a grid for a test object or, as illustrated, a test head 12, which may face upwards, this being convenient if the test object is, for example, a pair of hearing-aid spectacles, which in that case will rest securely on the test head 12. A test microphone is connected to a plug 14, whose conductor 15 passes through a bushing 16 in the bottom part 4.

It is advantageous to cast the cover 5 and the bottom part 4 with a smooth internal finish and with an outer layer of gel, which in such a case will be outside the glass-fibre reinforced plastic and thus form a smooth finished box.

Another possible embodiment of the test box is illustrated in more schematic fashion in FIG. 2. Here the cover 5 is shaped like a hemispherical shell, whereas the bottom part 4 is composed of a bottom section 4' in the shape of a hemispherical shell and a tubular middle section 4'' integrally secured thereto. In other respects the test chamber is constructed as shown in FIG. 1.

I claim:

1. An acoustic test box (1) comprising a rigid hollow top curved section (5) and a mating rigid hollow curved bottom section (4) and means (6) for connecting said two sections together to form a rigid hollow container, the inner surface of said container sections being lined with sound-absorbing materials (8,9) to enclose an anechoic test chamber accommodating a sound source (10), a test object (12) and a test microphone, all the surfaces of said container, the inner ones as well as the outer ones, consisting entirely of curved surfaces to enable the chamber to display an essentially constant velocity field and an essentially constant pressure field throughout the frequency range over which the frequency response is to be tested and to thereby secure substantially the same frequency response from said test object whether it be pressure sensitive or velocity sensitive.

2. An acoustic test box as claimed in claim 1, characterized in that the greatest dimension of the connected container sections is in the direction passing through the test object and the sound source.

3. An acoustic test box as claimed in claim 1, characterized in that said test box (1) is egg-shaped.

4. An acoustic test box as claimed in claim 3, characterized in that the egg-shaped box (1) has a support (2) which is so attached to the box (1) that the longest axis of said test box is vertical when the support (2) is standing on a horizontal floor (3), and that the narrow end of the egg-shaped test box (1) is facing downwards.

5. An acoustic test box as claimed in claim 1, characterized in that the division between the top section (5) and the bottom section (4) is located approximately two-thirds of the way up the container (1).

6. An acoustic test box as claimed in claim 5, characterized in that the sound source (10) is located in the top portion of said chamber.

7. An acoustic test box as claimed in claim 2, characterized in that the container is shaped like a tube (4'') which at each end is closed by end pieces (4', 5) in the shape of part-spherical segments.

* * * * *